(12) United States Patent  (10) Patent No.: US 6,690,824 B1
Stringa  (45) Date of Patent: Feb. 10, 2004

(54) AUTOMATIC RECOGNITION OF CHARACTERS ON STRUCTURED BACKGROUND BY COMBINATION OF THE MODELS OF THE BACKGROUND AND OF THE CHARACTERS

(75) Inventor: Luigi Stringa, Monaco (IT)

(73) Assignee: KBA-Giori S.A., Lausanne (CH)

( * ) Notice: Subject to any disclaimer, the term of this patent is extended or adjusted under 35 U.S.C. 154(b) by 448 days.

(21) Appl. No.: 09/596,546

(22) Filed: Jun. 19, 2000

(30) Foreign Application Priority Data

Jun. 21, 1999 (MC) .................................... 2427.99-2491

(51) Int. Cl.$^7$ ............................. G06K 9/34; G06K 9/68
(52) U.S. Cl. ...................... 382/176; 382/218; 382/294; 382/135
(58) Field of Search ................................. 382/176, 177, 382/294, 209, 217, 218, 135; 358/464

(56) References Cited

U.S. PATENT DOCUMENTS

| 5,598,006 | A | | 1/1997 | Stringa |
| 5,710,830 | A | * | 1/1998 | Holeva .................... 382/173 |
| 5,778,088 | A | | 7/1998 | Stringa |
| 5,915,039 | A | * | 6/1999 | Lorie et al. ................. 382/230 |
| 6,081,626 | A | * | 6/2000 | Bruegmann et al. ........ 382/260 |

FOREIGN PATENT DOCUMENTS

| EP | 0 796 735 | 9/1997 |
| MC | 2411.99.2479 | 4/1999 |

OTHER PUBLICATIONS

Ozawa et al. "A Character Image Enhancement Method from Characters with Various Background Images." Proc. 2$^{nd}$ Int. Conf. on Document Analysis and Recognition, Oct. 1993, pp. 58–61.*

Liang et al. "A Morphological Approach to Text String Extraction from Regular Periodic Overlapping Text/Background Images." ICIP–94, Proc. IEEE Int. Conf. Image Processing, vol. 1, Nov. 1994, pp. 144–148.*

Ali. "Background Noise Detection and Cleaning in Document Images." Proc. 13$^{th}$ Int. Conf. on Pattern Recognition, vol. 3, Aug. 1996, pp. 758–762.*

Koerich et al. "Automatic Extraction of Filled Information from Bankchecks." IEEE Int. Conf. on Systems, Man, and Cybernetics, vol. 3, Oct. 1997, pp. 2151–2156.*

Negishi et al. "Character Extraction from Noisy Background for an Automatic Reference System." ICDAR '99, Proc. 5$^{th}$ Int. Conf. on Document Analysis and Recognition, Sep. 20, 1999, pp. 143–146.*

Rice–Nagy–Nartkr—"Optical Character Recognition"— Kluwe Academic Publichers—1999.

* cited by examiner

Primary Examiner—Jon Chang
(74) Attorney, Agent, or Firm—Bugnion S.A.; John Moetteli

(57) ABSTRACT

The invention relates to a process for obtaining by electronic means the automatic recognition of characters, even if printed in a variable position on a highly contrasted structured background drawing. The process consists in firstly producing a model of the background, obtained by capturing with an electronic camera the images of several samples, on which images there is only the background. Thereafter, the models of the symbols (for example alphanumeric characters) to be recognized are produced, either capturing the images of a set of characters printed on white background, or using the commercially available computer files of the characters of the chosen fonts. At the time of recognition, the position of each of the characters to be recognized is firstly measured with respect to the position of the printing of the drawing of the background. Each character to be recognized is thereafter compared with models obtained by combining the models of the symbols with the model of the background, with the same relative position of the unknown character. Recognition of the character together with background is therefore achieved by comparison with models of the characters combined with the same background in the same position, using any well-known recognition techniques.

34 Claims, 5 Drawing Sheets

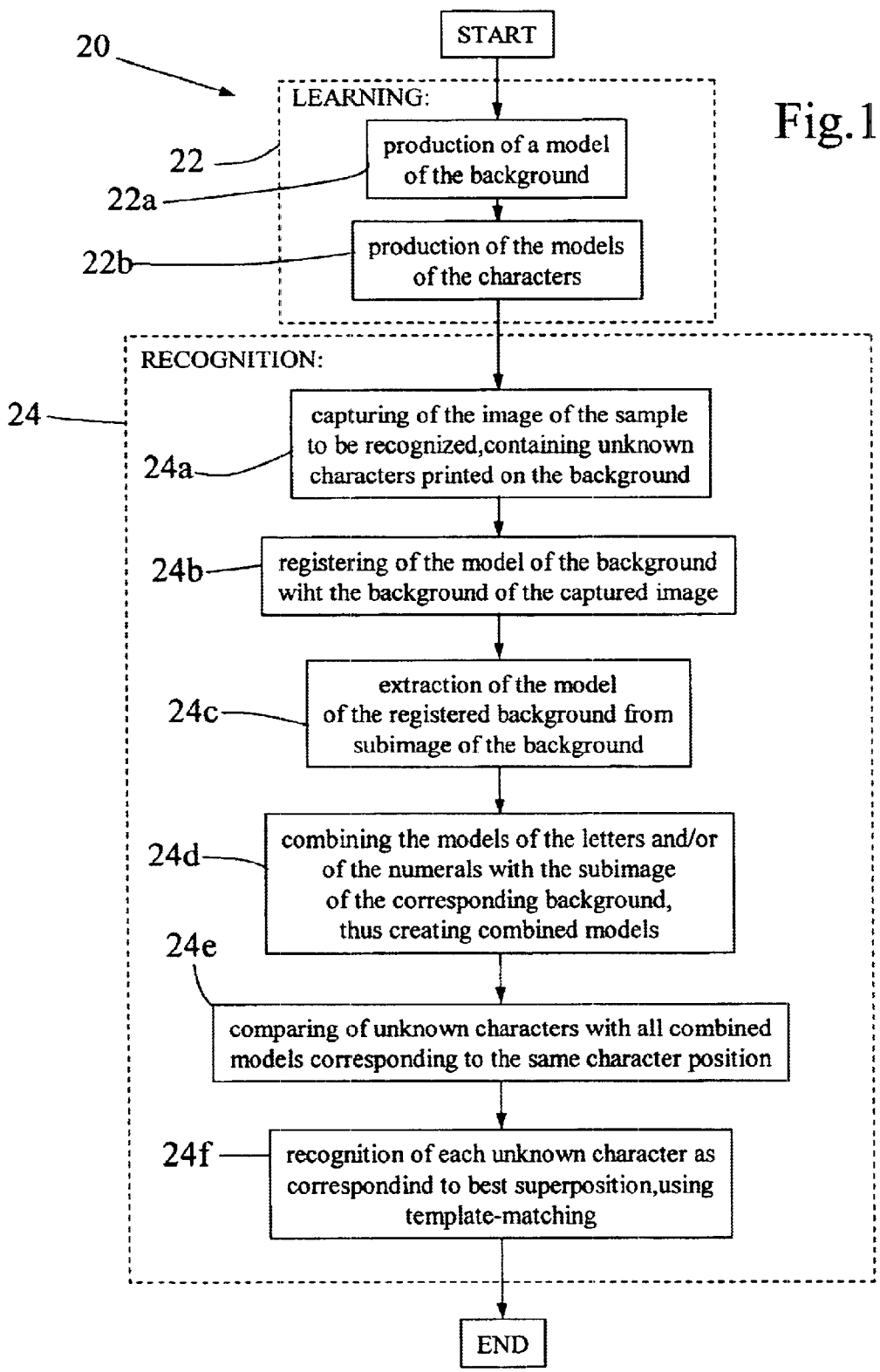

Fig.2a
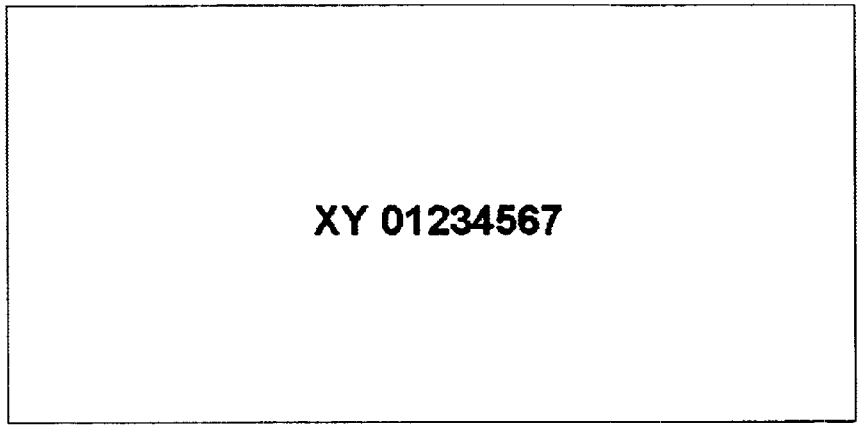
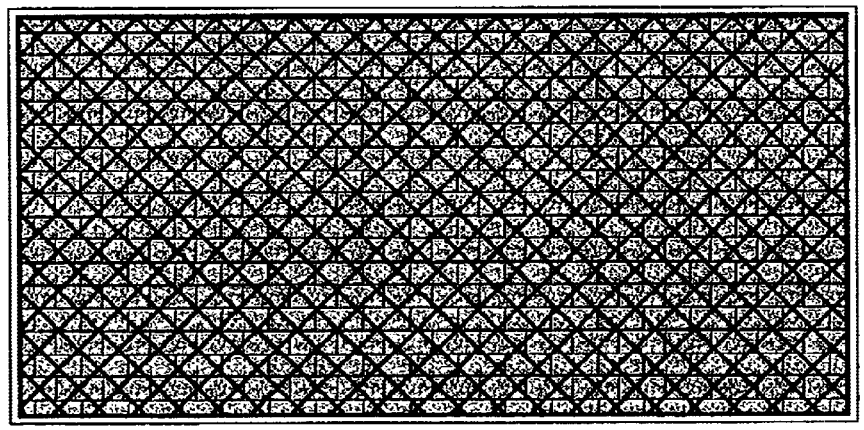
Fig.2b
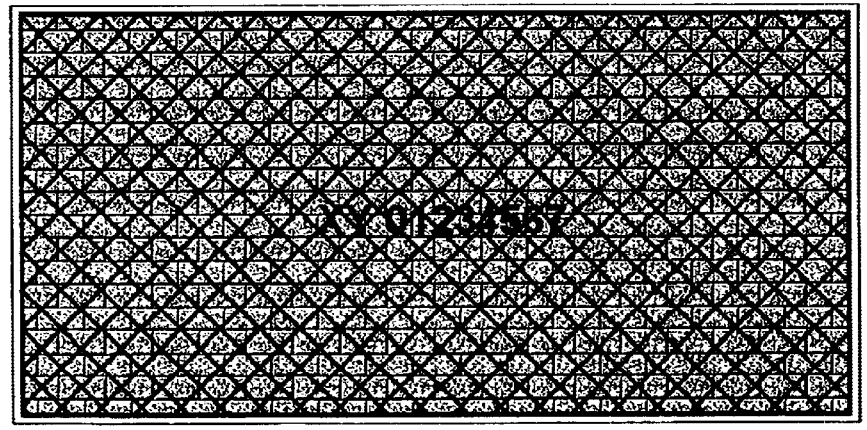
Fig.2c

AUTOMATIC RECOGNITION OF CHARACTERS ON STRUCTURED BACKGROUND BY COMBINATION OF THE MODELS OF THE BACKGROUND AND OF THE CHARACTERS

BACKGROUND OF THE INVENTION

The invention relates to a process for obtaining by electronic means the automatic recognition of characters, even if printed in a variable position on a highly contrasted structured background drawing. The process consists in firstly producing a model of the background, obtained by capturing with an electronic camera the images of several samples, on which images there is only the background. Thereafter, the models of the symbols (for example alphanumeric characters) to be recognized are produced, either capturing the images of a set of characters printed on white background, or using the commercially available computer files of the characters of the chosen fonts.

At the time of recognition, the position of each of the characters to be recognized is firstly measured with respect to the position of the printing of the drawing of the background. Each character to be recognized is thereafter compared with models obtained by combining the models of the symbols with the model of the background, with the same relative position of the unknown character. Recognition of the character together with background is therefore achieved by comparison with models of the characters combined with the same background in the same position, using any well-known recognition techniques.

The present invention relates to a process for the automatic recognition of the characters printed on any medium, even if the background exhibits highly contrasted structures, which therefore interfere considerably with the structure of the characters. There are several well-known character recognition techniques, as described in L. Stringa, "Procedure for Producing A Reference Model", U.S. Pat. No. 5,778,088, the content of which is hereby incorporated by reference. The great majority of known systems approach the problem by trying to separate the characters from the background by means of sometimes very ingenious and sophisticated thresholds. Unfortunately, this technique fails when the contrast of the structures of the background is very considerable, especially if the position of the characters can vary with respect to the said structures. Consequently, the images of the characters sometimes contain some signs of the background (those which exceeded the threshold) or sometimes they are not complete, since a part of the structure of the characters has not exceeded the threshold. Such for example is the case with bank notes, the printing of whose serial numbers takes place in a phase separated from (usually following) the printing of the remainder, and generally with a different printer. The registration cannot therefore be perfect, and consequently the serial numbers "move" with respect to the background: if they are printed on a structured area of the note, that is to say on a drawn area, they move with respect to the structure (the drawing) of the background. Moreover, in the cases cited, even the search for and the segmenting of the characters are at risk of failing on account of the structures of the background.

Indeed, even if with a vast amount of variations, the extraction and recognition procedure almost always involves the following stages:

capture of the images of the document, and more generally, of the object containing the characters to be recognized. Capture is achieved by means of an electronic camera, and is usually followed by computations aimed at improving the contrast and reducing the noise search over the image (henceforth electronic) for the position of the characters to be recognized. The search is often based on an analysis of the abrupt changes of illumination (such as switching from white to black), in particular of their spatial distributions segmentation of the area identified into subareas, each containing a single character. Segmentation is achieved for example by analyzing the projection of the density of black onto a segment parallel to the base of the line of characters: the minima of this density can be correlated with the white space between characters.

each character thus isolated is compared with prototypes (models) of all the letters and/or of all the numerals, either in terms of superposability (techniques known as "template-matching"), or in terms of sequence of characteristic structures, such as vertical, horizontal or oblique line-type, etc. (techniques known as "features extraction" or structural analysis).

In any case it is obvious that if the part of the image segmented as character contains structures which are foreign to the shape of the actual character (for example lines belonging to the structure of the background), the risk of failure of the comparison with said prototypes is very high. This is a risk that may also be a consequence of the loss of discriminating parts of the structure of the character subsequent to overly drastic thresholding in the characters/background separation phase.

This is why the previous approaches to the automatic recognition of characters printed on highly structured backgrounds with high contrast are not sufficiently profitable.

SUMMARY OF THE INVENTION

According to the present invention, the objects on which the characters to be recognized are printed are analyzed optically by well known optoelectronic means, such as for example a CCD camera (linear or matrix type, black and white or color), with the desired resolution for producing electronic images of the characters to be recognized. In what follows, the "term" image will be used in the sense of electronic image, in particular a discrete set of density values, in general organized as a rectangular matrix. Each element of the matrix, the so-called pixel, is a measure of the intensity of the light reflected by the corresponding part of the object. For color images, the description generally consists of three matrices corresponding to the red, green and blue components of each pixel. For simplicity, the following description relates to the black and white case: the extension to color is achieved by repeating the same operations on the three matrices. Aim of the invention is the automatic recognition in electronic images of characters printed on a highly structured background whose contrast may even be comparable with the contrast of structures of the characters, as in the example of FIG. 2c. The first step of the process underlying the present invention consists in producing a model of the background which can be obtained capturing images of one or more samples on which only the drawing of the background is present, without any character (see for example FIG. 2b.

In particular, it is possible to use as model the average of the images of the so-called samples: in the case of black and white images there will be a single average-matrix, whilst in the case of color images there will be three average-matrices, for example red, green and blue. The models of the symbols (for example letters and/or numerals) to be recognized are produced subsequently, either capturing the images of a set of characters printed on a white background, or using directly the electronic images of computer files which are nowadays commercially available for most "fonts". In the first case, the model of each symbol to be recognized can be constructed as the average of the images of a certain number of specimens of the same symbol printed on white background.

Once the models of the symbols and the model of the background have been constructed, the first phase of the process, which might well be called the "learning phase", is terminated.

During the recognition phase, the following steps are carried out:

capturing of the image of the sample to be recognized, which contains the unknown characters printed on the background in a position which is itself also unknown (example FIG. 3a).

registering of the model of the background with the image captured, by means of any of the well-known techniques for registering images, for example using the method of maximum correlation subtraction of the (registered) model from the image captured: the difference image, where the background will be almost eliminated, clearly evidences the position of the characters (plate II/4-b, difference of image minus model of the background registered)

search for the position of each of the characters in the difference image. The operation is achieved by means of any of the well-known techniques for locating and segmenting characters, such as analyzing the abrupt transitions in density, of the black/white switch type. For each character position one will therefore have isolated a subimage, whose dimensions are the same as those of the models of the symbols (FIG. 4, subimages of the segmented characters)

extraction of the model of the registered background from the subimage of the background corresponding to each unknown character combining, for each of the character positions, of the models of the symbols with the subimage of the corresponding background model (FIG. 4). Since the model of the background was registered with the background of the image containing the characters to be recognized, in the combined subimages, model of the background-model of numerals and/or letters, the relative character/background position is the same as in the unknown image. During synthesis, new prototypes (the combined models) of the symbols (letters and/or numerals) with the same background as in the unknown image will therefore have been produced for each character position. One developed combining technique will be described in the chapter "description of a few preferred variants", but any one of the methods proposed by other authors could well be used comparing of each of the unknown characters with all the models combined in the previous steps. Recognition of the character together with background is therefore achieved by comparison with models of the symbols with the same background and in the same position. Any of the well-known recognition techniques may well be used, such as the template-matching or features extraction method, etc.

BRIEF DESCRIPTION OF THE DRAWINGS

FIG. 1 is a flow chart of the method of the invention.

FIGS. 2a to 2c show an example of characters printed on a highly structured background with high contrast on which is shown a sequence of characters printed on a white background, the drawing of the background, and the sequence printed on the background.

DETAILED DESCRIPTION OF THE PREFERRED EMBODIMENT(S)

Figure 3A:
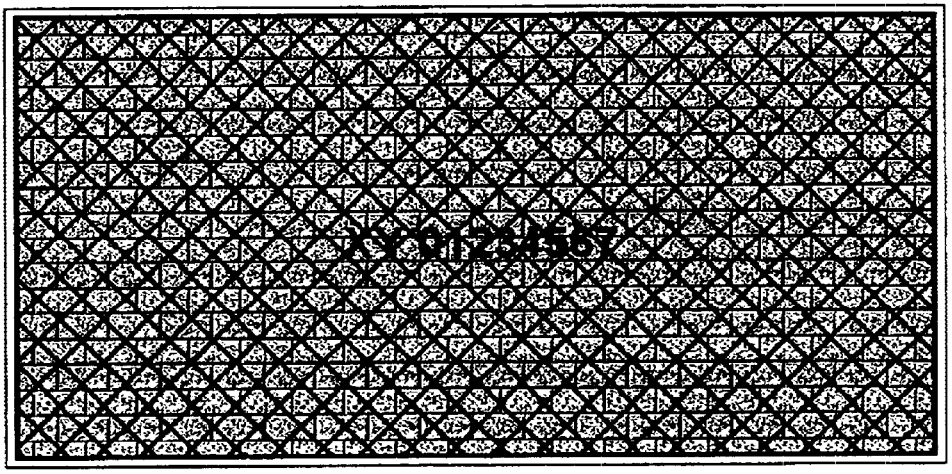
FIGS. 3a and 3b are the same as FIG. 2 except that FIG. 3b shows the result of subtracting the registered background model from the image of the completely printed note.
Figure 3B:
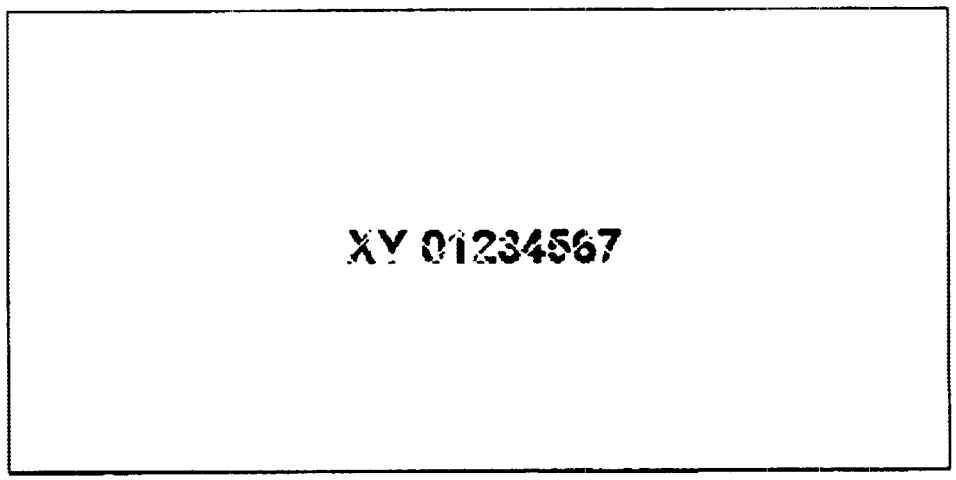
Figure 4:
FIG. 4 shows the portion of the note of the example of the previous plates containing the characters to be recognized and the subimages corresponding to each character position, as resulting from the segmentation as well as, for each position, the corresponding combination of the subimages of the registered background with the models of all the possible symbols, and hence the combined models described in the text. The example demonstrates how the characters to be processed can be rather more effectively recognized if compared with the combined models rather than with the models of the symbols printed on white background (see for example in FIG. 4).

Referring now to FIG. 1, a process 20 for obtaining by electronic means the automatic recognition of characters, even if printed in a variable position on a highly contrasted structured background drawing, is provided. The process 20 using an optoelectronic device for image capture and an image computation system. The process 20 comprises a learning step 22 and a recognition step 24.

The learning step 22 includes two substeps 22a and 22b. In the first substep 22a, a model of the background is produced, obtained by capturing the images of one or more samples, on which images there is only the background. In another substep 22b, the models of the characters (symbols, alphabetic and/or numerical) are produced, obtained capturing the images of a set of characters printed on white background containing at least one character per symbol.

The recognition step 24 including several substeps 24a to 24f. In a first substep 24a, an image of the sample to be recognized is captured, which contains the unknown characters printed on the background. In a second substep 24b, the model of the background is registered with the background of the image captured. In a third substep 24c, the model of the registered background is extracted from the subimage of the background corresponding to each unknown character. In a fourth substep 24d, the models of the letters and/or of the numerals, for each character position, are combined with the subimage of the corresponding background, thus creating combined models. In a fifth substep 24e, the unknown characters are compared with all the combined models corresponding to the same character position. In a sixth substep 24f, each unknown character is recognized as corresponding to the symbol the combined model of which superposes best with it, according to a technique referred to as the template-matching technique.

In what follows, one of the preferred variants relating to the automatic recognition of serial numbers printed on bank notes will be described as a non-limiting example of the present invention. Indeed, in several types of notes the serial number is printed, in part or in whole, on the drawing of the note. The printing of bank notes is achieved in particular with a mixture of different techniques, generally at least offset and copperplate. The latter in particular usually exhibits areas with a large quantity of lines at very high contrast: when the serial number is printed on one of these areas it is rather difficult with the conventional techniques to separate the characters from the background, and hence to recognize them. Moreover, the serial number is normally printed in the final phase of production, after offset and copperplate, and on a different machine. Even if very sophisticated registration systems are used, the relative register between the serial numbers and the drawing of the background turns out to be rather variable, and may normally "move" by a few millimeters.

Figure 5:
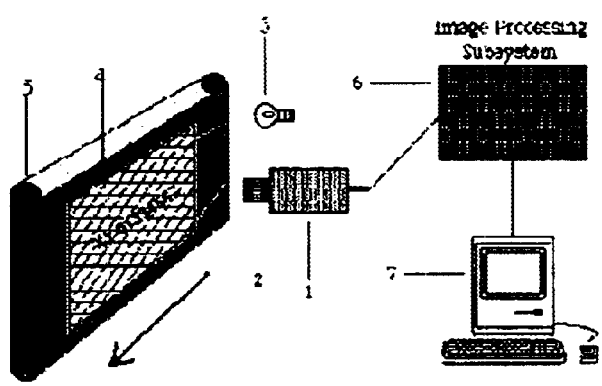
FIG. 5 shows a typical arrangement of the recognition system described in the text.

FIG. 5 shows an arrangement of the system for recognizing serial numbers in bank notes where a linear CCD camera 1, together with its lenses 2 and its illumination system 3, is used to capture the images of the notes 4 whose serial numbers one wishes to read while they are transported by the sucker ribbon 5.

The lines scanned by the camera are stored in sequence in a first buffer-memory circuit of the image computation subsystem 6 so as to produce an electronic image of each note.

The image computation subsystem 6, which could be based either on special hardware or on programmable computers, such as DSPs (Digital Signal Processors), very fast PCs, etc., carries out various operations during the learning phases (model of the background and models of the characters), and the recognition phase.

During the background model learning phase:

- it captures the images of the unnumbered notes chosen as the "Background Learning Set" (BLS) and stores it in an appropriate memory
- it extracts a "reference" image from the BLS for registration, either automatically (for example the first of the BLS), or with the aid of the operator, by means of the console of the Operator Interface 7
- it registers all the images of the BLS by firstly identifying the horizontal displacement Δx and vertical displacement Δy of each image with respect to the reference image, subsequently applying a shift of −Δx and −Δy. In this variant the displacement is measured using the method of maximum correlation: a small rectangular portion $S_0$ (registration core) of the reference image, with center on the coordinates $x_0$, $y_0$ chosen for example by the Operator (outside the area of printing of the characters), is compared with a portion $S_1$, with the same dimensions, whose center is displaced step by step onto each position (pixel) of the image of the BLS so as to find the position $x_1$, $y_1$ where the correlation coefficient has its maximum (this corresponds to the best superposition of the two images). The displacement is then given by:

$$\Delta x = x_1 - x_0 \text{ and } \Delta y = y_1 - y_0.$$

According to this variant the model of the background $M_b$ is obtained as the arithmetic mean of the images of the BLS registered with the reference image.

During the phase of learning the models of the symbols, the image computation subsystem 6:

- captures the images of a set of notes whereon one wishes to print, on a white background, all the numerals and/or the letters used in the serial numbers, each one once and in known positions (Character Learning Set—CLS)
- it subsequently segments the images of the CLS into subimages each containing a single character. According to this variant, the segmentation is achieved with a standard technique for analyzing white/black transitions which is very effective when the characters are printed on a white background
- it produces the model $M_s$ of each symbol (numeral or letter) as the mean over CLS of the subimages of each position, registered for example with that of the first note of the CLS taken as reference. Registration and averaging are carried out as in the case of the background, but the registration cores coincide with the entire character subimage.

Usually the serial number of the bank notes uses the alphabetic and numeric characters of a single font, and therefore one position on the CLS notes per symbol would normally be sufficient (a single A, a single B, etc.). Otherwise, it will in general be necessary to provide for as many positions per symbol as fonts employed (for example: A New York, A Courier, A Geneva, etc.).

During the recognition phase, according to the present variant of the invention, the image computation subsystem 6, after image capture:

- firstly registers the image of the background of each note to be read with the model of the background, by means of the same registration core used for learning the model and with the same correlation technique
- therefore produces the complete note (registered) minus model of the background difference image and then searches for the character positions: the technique used is based on the already mentioned analysis of transitions. In general, the search can be performed over a limited area of the note, since the print of the serial number moves with respect to the drawing of the background only by a few millimeters
- extracts, for each character position registered on the difference image, the corresponding subimage of the model of the background: having been registered, said subimage would be precisely the portion of background on which the unknown character has been printed
- for each character position, combines the corresponding subimage of the model of the background $M_b$ (registered) with each of the models of the symbols $M_s$.

The new models, characters plus background, will also be obtained for each character position, with the same relative position as on the note to be read. In this variant of the invention, said combination $M_c$ is obtained pixel by pixel with the equations:

$$M_c = K_0 M_b M_s + K_1 (1 - \sqrt{M_s}) \quad [1]$$

if the background was printed first, followed by the characters, otherwise:

$$M_c = K_0 M_b M_s + K_1 (1 - \sqrt{M_b}) \quad [2]$$

In any event, $K_0$ and $K_1$ are constants characteristic of the inks and of the paper employed. In equations [1] and [2] the first term (product $K_0 M_b M_s$) takes account of the transmissivity of the inks employed and of the reflectivity of the paper, whereas the second term is related to the reflectivity of the surface of the ink printed as last.

- for each character position, calculates the coefficient of correlation between the corresponding subimage of the note and all the new models (characters plus background): the character to be processed is recognized as that of the combined model corresponding to the maximum of said correlation coefficient
- according to this variant of the invention, said maximum of the correlation coefficient is moreover compared with a threshold so as to verify the quality of printing of the character and of the background of the subimages corresponding to each character position. If the quality is good (subimage to be processed and combined model almost identical) the coefficient is very nearly 1, whereas a very poor quality would produce a coefficient nearer to zero.

The other preferred variants include:

a) application to the recognition of characters on documents other than bank notes, such as letters, postcards, labels, bank cheques or postal orders, etc.

b) the substituting of the ribbon transport system with transport desirable for sheets of large dimensions, for example a cylinder as in printing machines or according to the patent in reference (4)

c) the substituting of the linear camera with a matrix type camera d) the use of the mean of the images of the BLS as reference image for the registering of the background e) the automatic extraction of the registration core for the registering of the background, for example according to the technique proposed in reference (1)

f) the constructing of the model of the background with a process other than averaging, for example according to the technique indicated in reference (2).

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

REFERENCES (1) L. Stringa—"Inspection Automatique de la qualité d'impression par un modèle élastique" [Automatic inspection of printing quality by an elastic model]—Patent No. 2411.99.2479 granted by the Minister of State of the Principality of Monaco (27.04.99)

(2) L. Stringa—"Procedure for Producing A Reference Model etc."—U.S. Pat. No. 5,778,088—Jul. 7, 1998, the contents of which are incorporated by reference.

(3) L. Stringa—"Procédé de contrôle automatique de la qualité d'impression d'une image multichrome" [Process for automatically checking the printing quality of a multichrome image]—European Patent Application No., 97810160.8-2304.

(4) L. Stringa—"Installation for Quality Control of Printed Sheets, Especially Security Paper"—U.S. Pat. No. 5,598,006—Jan. 28, 1998

(5) Rice-Nagy-Nartkr—"Optical Character Recognition"—Kluwer Academic Publishers—1999

The contents of the above references are incorporated herein by reference thereto.

What is claimed is:

1. Process for obtaining by electronic means the automatic recognition of characters, such as symbols alphabetic and/or numeric, printed on any medium including structures exhibiting high contrast, even when the background exhibits highly contrasted structures, by using an optoelectronic device for image capture and an image computation system, said process comprising the following steps:

a) a learning step, including the following substeps:
   1) production of a model of the background, obtained by capturing the images of one or more samples, on which images there is only the background;
   2) production of the models of the characters (symbols, alphabetic and/or numerical), obtained capturing the images of a set of characters printed on white background containing at least one character per symbol;

b) a recognition step, including the following substeps:
   1) capturing of the image of the sample to be recognized, which contains the unknown characters printed on the background;
   2) registering of the model of the background with the background of the image captured;
   3) extraction of the model of the registered background from the subimage of the background corresponding to each unknown character;
   4) combining, for each character position, of the models of the letters and/or of the numerals with the subimage of the corresponding background, thus creating combined models;
   5) comparing of the unknown characters with all the combined models corresponding to the same character position; and
   6) recognition of each unknown character as corresponding to the symbol, the combined model of which superposes best with it, according to a technique referred to as the template-matching technique.

2. The process as claimed in claim 1 in which the model of the background is one of the images of a BLS (Background Learning Set).

3. The process as claimed in claim 1 in which the model of the background is the average of the images of the BLS (Background Learning Set), mutually registered.

4. The process as claimed in claim 1 in which the model of the background is obtained via a set of samples containing either the background or the characters, according to a character/background separation technique.

5. The process as claimed in claim 1, 2, 3 or 4 in which the models of the symbols to be recognized are obtained as averages of the corresponding images of a CLS (Character Learning Set).

6. The process as claimed in claim 1, 2, 3 or 4 in which the models of the characters to be recognized are obtained via computer files.

7. The process as claimed in claim 1, 2, 3 or 4, wherein a known recognition technique is substituted for the template-matching technique.

8. The process as claimed in claim 5, wherein a known recognition technique is substituted for the template-matching technique.

9. The process as claimed in claim 6, wherein a known recognition technique is substituted for the template-matching technique.

10. The process as claimed in claim 1, 2, 3 or 4, wherein a color image capture system is used, of which the recognition is utilized in the color channel which gives the best superposition.

11. The process as claimed in claim 5, wherein a color image capture system is used, of which the recognition is utilized in the color channel which gives the best superposition.

12. The process as claimed in claim 6, wherein a color image capture system is used, of which the recognition is utilized in the color channel which gives the best superposition.

13. The process as claimed in claim 7, wherein a color image capture system is used, of which the recognition is utilized in the color channel which gives the best superposition.

14. The process as claimed in claim 1, 2, 3 or 4, but using a color image capture system, of which the recognition is utilized on the combination of the color channels.

15. The process as claimed in claim 5, but using a color image capture system, of which the recognition is utilized on the combination of the color channels.

16. The process as claimed in claim 6, but using a color image capture system, of which the recognition is utilized on the combination of the color channels.

17. The process as claimed in claim 7, but using a color image capture system, of which the recognition is utilized on the combination of the color channels.

18. The process as claimed in claim 1, 2, 3 or 4 wherein on each image to be processed is obtained the separation of the unknown characters from the background by subtraction of the model of the registered background.

19. The process as claimed in claim 10, wherein on each image to be processed is obtained the separation of the unknown characters from the background by subtraction of the model of the registered background.

20. The process as claimed in claim 14, wherein on each image to be processed is obtained the separation of the unknown characters from the background by subtraction of the model of the registered background.

21. The process as claimed in claim 1, 2, 3 or 4, of which the combination of the models of the background and of the symbols is effected according to the following equation:

$$M_c = K_0 M_b M_s + K_1 (1 - \sqrt{M_s})$$

and if the background was not printed first, the following equation:

$$M_c = K_0 M_b M_s + K_1 (1 - \sqrt{M_b}).$$

22. The process as claimed in claim 5, of which the combination of the models of the background and of the symbols is effected according to the following equation:

$$M_c = K_0 M_b M_s + K_1 (1 - \sqrt{M_s})$$

and if the background was not printed first, the following equation:

$$M_c = K_0 M_b M_s + K_1 (1 - \sqrt{M_b}).$$

23. The process as claimed in claim 6, of which the combination of the models of the background and of the symbols is effected according to the following equation:

$$M_c = K_0 M_b M_s + K_1 (1 - \sqrt{M_s})$$

and if the background was not printed first, the following equation:

$$M_c = K_0 M_b M_s + K_1 (1 - \sqrt{M_b}).$$

24. The process as claimed in claim 7, of which the combination of the models of the background and of the symbols is effected according to the following equation:

$$M_c = K_0 M_b M_s + K_1 (1 - \sqrt{M_s})$$

and if the background was not printed first, the following equation:

$$M_c = K_0 M_b M_s + K_1 (1 - \sqrt{M_b}).$$

25. The process as claimed in claim 10, of which the combination of the models of the background and of the symbols is effected according to the following equation:

$$M_c = K_0 M_b M_s + K_1 (1 - \sqrt{M_s})$$

and if the background was not printed first, the following equation:

$$M_c = K_0 M_b M_s + K_1 (1 - \sqrt{M_b}).$$

26. The process as claimed in claim 14, of which the combination of the models of the background and of the symbols is effected according to equations to the following equation:

$$M_c = K_0 M_b M_s + K_1 (1 - \sqrt{M_s})$$

and if the background was not printed first, the following equation:

$$M_c = K_0 M_b M_s + K_1 (1 - \sqrt{M_b}).$$

27. The process as claimed in claim 1, 2, 3 or 4, used to verify the quality of the printed characters by thresholding the value of the coefficient of correlation between the subimage of each of the character positions and the corresponding combined model chosen at the recognition level.

28. The process as claimed in claim 5, used to verify the quality of the printed characters by thresholding the value of the coefficient of correlation between the subimage of each of the character positions and the corresponding combined model chosen at the recognition level.

29. The process as claimed in claim 6, used to verify the quality of the printed characters by thresholding the value of the coefficient or correlation between the subimage of each of the character positions and the corresponding combined model chosen at the recognition level.

30. The process as claimed in claim 7, used to verify the quality of the printed characters by thresholding the value of the coefficient of correlation between the subimage of each of the character positions and the corresponding combined model chosen at the recognition level.

31. The process as claimed in claim 10, used to verify the quality of the printed characters by thresholding the value of the coefficient of correlation between the subimage of each of the character positions and the corresponding combined model chosen at the recognition level.

32. The process as claimed in claim 14, used to verify the quality of the printed characters by thresholding the value of the coefficient of correlation between the subimage of each of the character positions and the corresponding combined model chosen at the recognition level.

33. The process as claimed in claim 18, used to verify the quality of the printed characters by thresholding the value of the coefficient of correlation between the subimage of each of the character positions and the corresponding combined model chosen at the recognition level.

34. The process as claimed in claim 21, used to verify the quality of the printed characters by thresholding the value of the coefficient of correlation between the subimage of each of the character positions and the corresponding combined model chosen at the recognition level.

* * * * *

UNITED STATES PATENT AND TRADEMARK OFFICE
CERTIFICATE OF CORRECTION

PATENT NO.    : 6,690,824 B1
DATED         : February 10, 2004
INVENTOR(S)   : Stringa It is certified that error appears in the above-identified patent and that said Letters Patent is hereby corrected as shown below:

<u>Title page,</u>
Item [75], replace "Luigi Stringa, Monaco (IT)" by -- Luigi Stringa, Monaco (Monte Carlo) --

Signed and Sealed this

Twenty-seventh Day of April, 2004

JON W. DUDAS
*Acting Director of the United States Patent and Trademark Office*